(12) United States Patent
Goldman-Shenhar

(10) Patent No.: US 9,904,362 B2
(45) Date of Patent: Feb. 27, 2018

(54) SYSTEMS AND METHODS FOR USE AT A VEHICLE INCLUDING AN EYE TRACKING DEVICE

(71) Applicant: GM GLOBAL TECHNOLOGY OPERATIONS LLC, Detroit, MI (US)

(72) Inventor: Claudia V. Goldman-Shenhar, Mevasseret Zion (IL)

(73) Assignee: GM Global Technology Operations LLC, Detroit, MI (US)

(*) Notice: Subject to any disclaimer, the term of this patent is extended or adjusted under 35 U.S.C. 154(b) by 79 days.

(21) Appl. No.: 14/523,021

(22) Filed: Oct. 24, 2014

(65) Prior Publication Data

US 2016/0116977 A1    Apr. 28, 2016

(51) Int. Cl.
| | | |
|---|---|---|
| *G06F 3/01* | (2006.01) | |
| *G06F 3/00* | (2006.01) | |
| *B60K 37/00* | (2006.01) | |
| *B60W 50/14* | (2012.01) | |
| *G01C 21/36* | (2006.01) | |

(52) U.S. Cl.
CPC ............ *G06F 3/013* (2013.01); *B60K 37/00* (2013.01); *G06F 3/005* (2013.01); *B60W 50/14* (2013.01); *G01C 21/3679* (2013.01); *G01C 21/3691* (2013.01)

(58) Field of Classification Search
CPC ......... G06F 3/013; G06F 3/005; B60K 37/00; B60K 37/02; G01C 21/3679; G01C 21/3691
See application file for complete search history.

(56) References Cited

U.S. PATENT DOCUMENTS

| | | | | |
|---|---|---|---|---|
| 5,689,619 A | * | 11/1997 | Smyth | G02B 27/0093 345/156 |
| 5,786,765 A | * | 7/1998 | Kumakura | G08B 21/06 340/575 |
| 6,356,812 B1 | * | 3/2002 | Cragun | B60K 35/00 340/990 |
| 7,391,887 B2 | | 6/2008 | Durnell | |
| 7,522,344 B1 | | 4/2009 | Curatu et al. | |
| 8,552,850 B2 | | 10/2013 | De Mers et al. | |
| 8,692,739 B2 | * | 4/2014 | Mathieu | B60R 1/00 340/436 |
| 8,781,170 B2 | * | 7/2014 | Mathieu | G01C 21/365 382/104 |
| 9,135,803 B1 | * | 9/2015 | Fields | B60K 28/066 |
| 2004/0044293 A1 | * | 3/2004 | Burton | A61B 5/18 600/544 |
| 2007/0203643 A1 | * | 8/2007 | Ramaswamy | G01C 21/3679 701/427 |
| 2008/0061958 A1 | * | 3/2008 | Birk | B60Q 9/00 340/517 |

(Continued)

FOREIGN PATENT DOCUMENTS

| | | | | |
|---|---|---|---|---|
| EP | 2390139 A1 | * | 11/2011 | ............. B60Q 3/046 |
| EP | 2544072 A2 | * | 1/2013 | ............. B60K 35/00 |

*Primary Examiner* — Darlene M Ritchie
(74) *Attorney, Agent, or Firm* — Stephen J. Terrell; Parks IP Law LLC

(57) ABSTRACT

Systems and methods for a vehicle including an eye tracking device. The systems and methods use input from the eye tracking device. The systems and methods are configured to communicate with a driver based on input from the eye tracking device.

6 Claims, 10 Drawing Sheets

(56) References Cited

U.S. PATENT DOCUMENTS

| | | | |
|---|---|---|---|
| 2009/0097705 A1* | 4/2009 | Thorn | G06Q 10/02 382/103 |
| 2009/0176511 A1* | 7/2009 | Morrison | G06Q 30/02 455/456.3 |
| 2009/0243880 A1* | 10/2009 | Kiuchi | G08G 1/166 340/903 |
| 2010/0007479 A1* | 1/2010 | Smith | B60W 50/14 340/436 |
| 2010/0033333 A1* | 2/2010 | Victor | A61B 3/113 340/576 |
| 2010/0222976 A1* | 9/2010 | Haug | B60K 28/04 701/70 |
| 2011/0199202 A1 | 8/2011 | De Mers et al. | |
| 2011/0310001 A1 | 12/2011 | Madau et al. | |
| 2012/0173067 A1* | 7/2012 | Szczerba | G02B 27/01 701/23 |
| 2012/0173069 A1* | 7/2012 | Tsimhoni | G01C 21/365 701/25 |
| 2012/0212353 A1* | 8/2012 | Fung | B60K 28/06 340/905 |
| 2012/0215375 A1* | 8/2012 | Chang | B60W 50/14 701/1 |
| 2012/0230547 A1 | 9/2012 | Durnell et al. | |
| 2014/0249717 A1* | 9/2014 | Takahashi | B60R 21/00 701/36 |
| 2014/0250395 A1* | 9/2014 | Tanaka | G06F 3/013 715/765 |
| 2014/0303842 A1* | 10/2014 | Boelter | B60K 35/00 701/36 |
| 2015/0010207 A1* | 1/2015 | Inada | B60K 35/00 382/103 |
| 2015/0062168 A1* | 3/2015 | Ng-Thow-Hing | G02B 27/01 345/633 |
| 2015/0073652 A1* | 3/2015 | Bennie | B60W 50/00 701/36 |
| 2015/0210292 A1* | 7/2015 | George-Svahn | B60W 50/10 701/45 |
| 2015/0258996 A1* | 9/2015 | Victor | G09B 19/16 340/576 |
| 2016/0009294 A1* | 1/2016 | Gunaratne | B60W 50/12 701/36 |

* cited by examiner

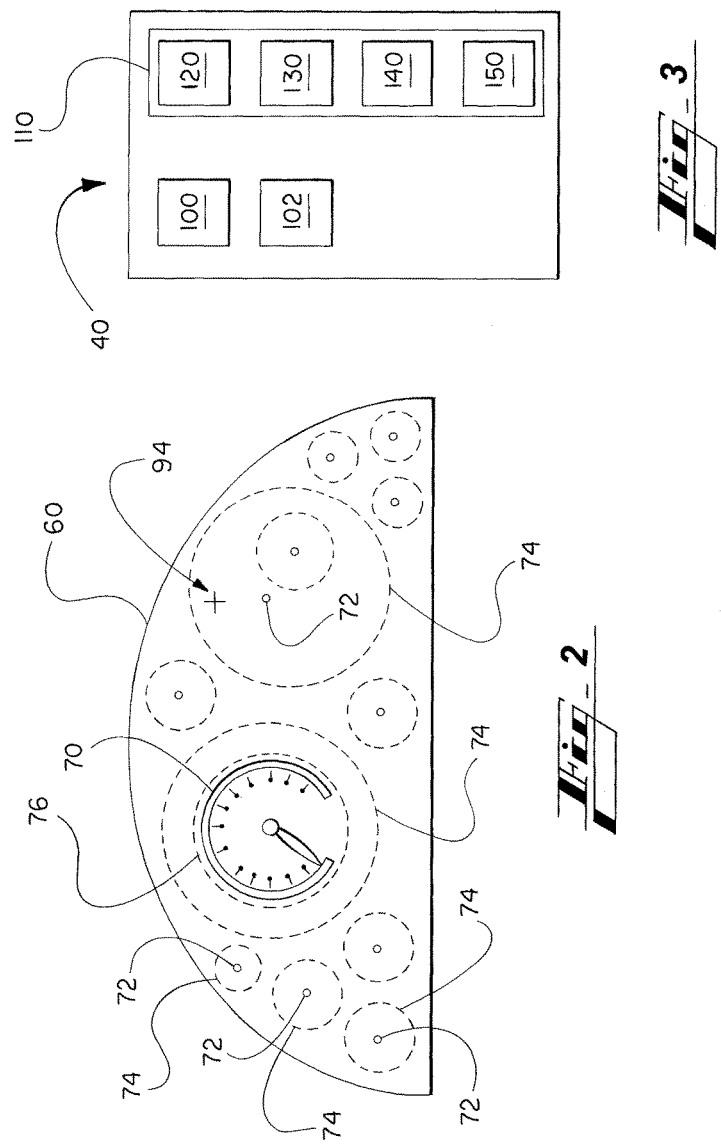

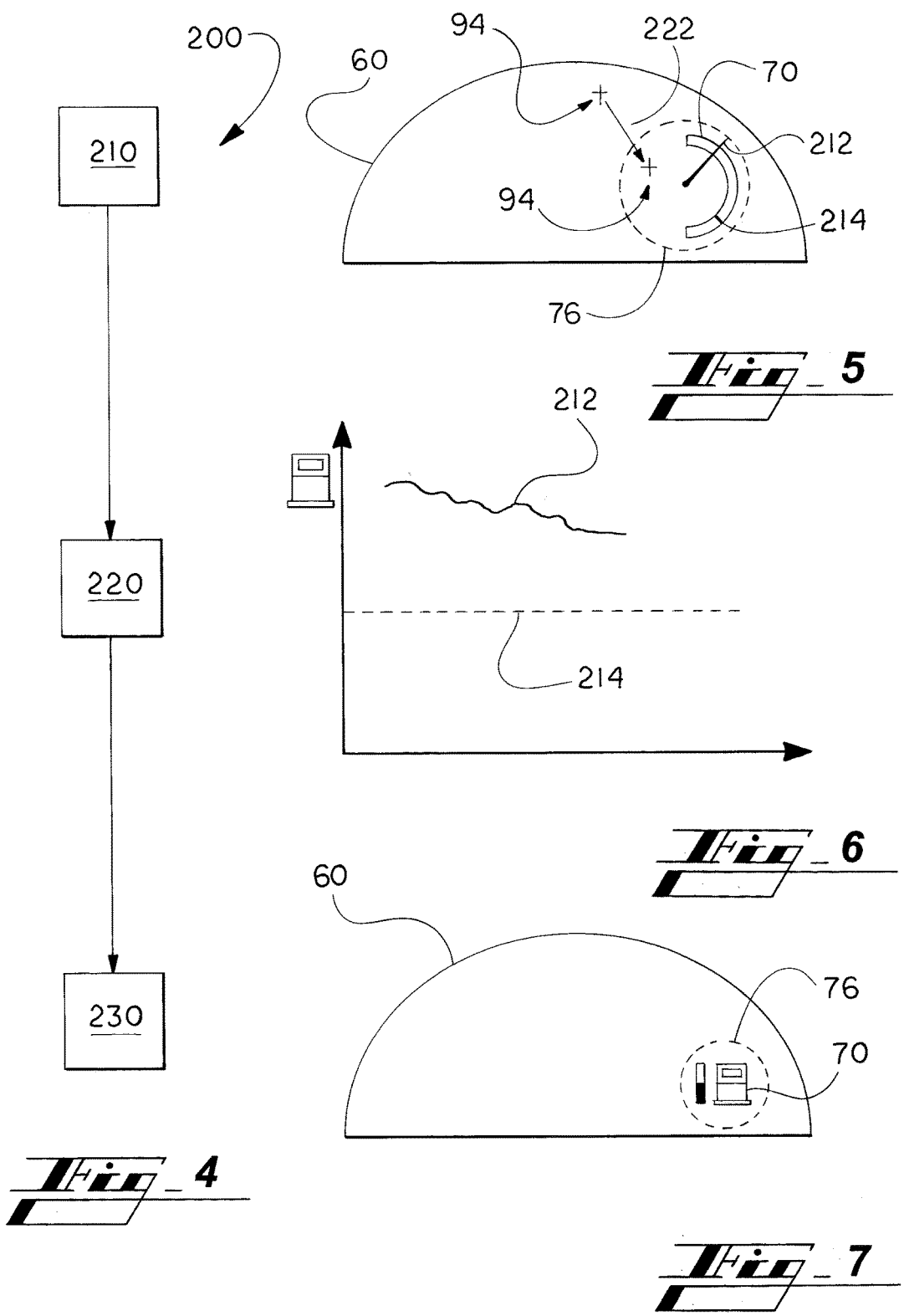

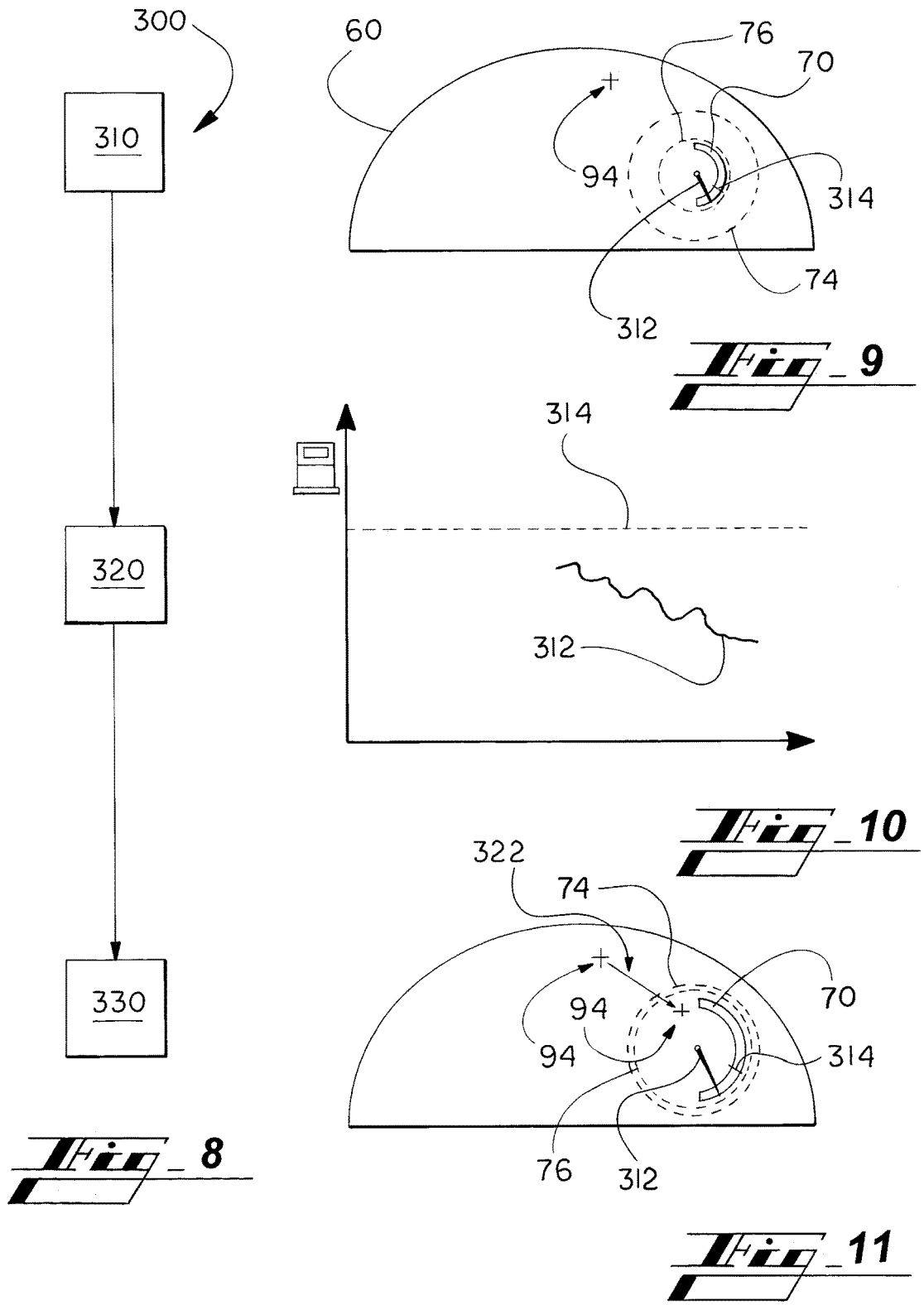

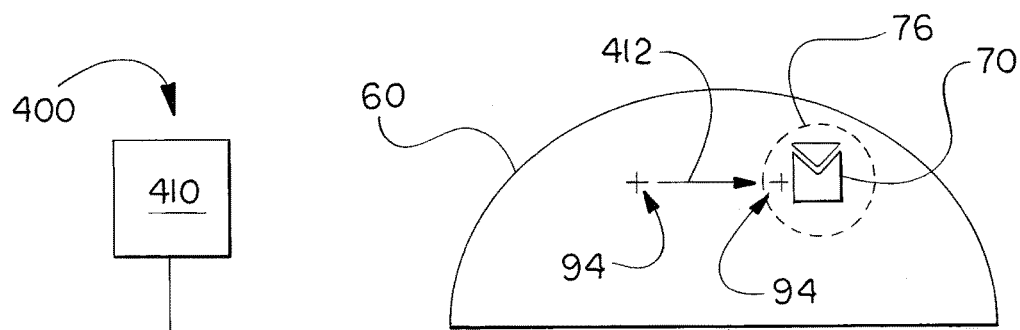
Fig_13
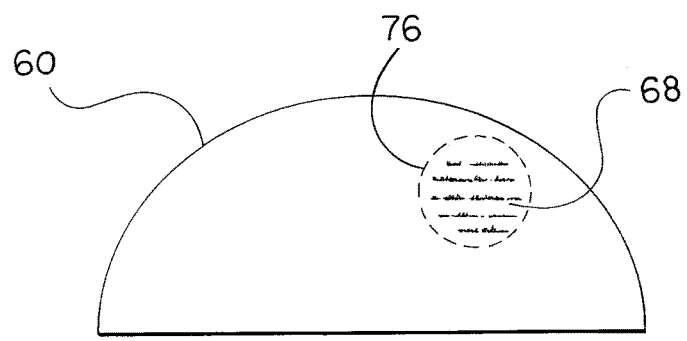
Fig_12
Fig_14
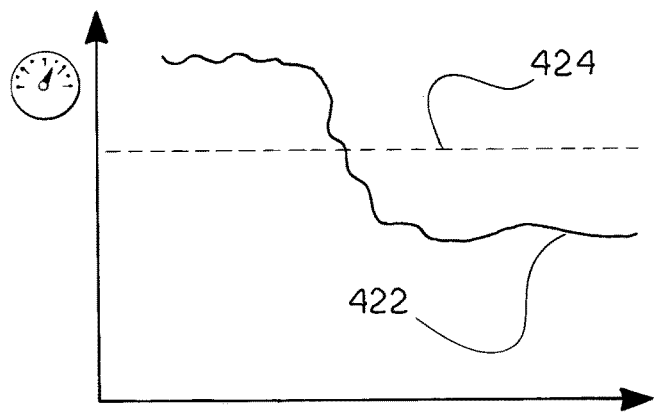
Fig_15

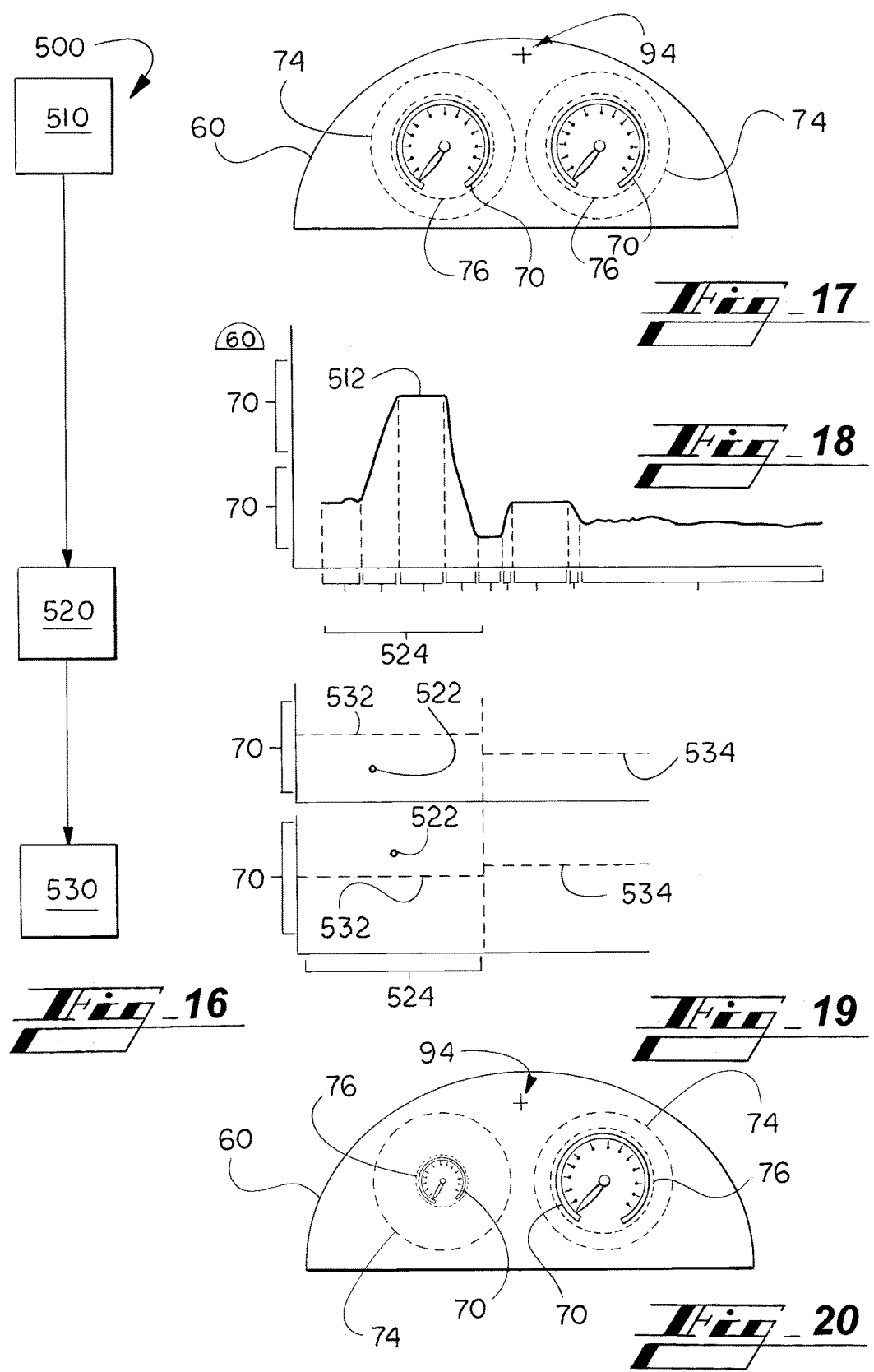

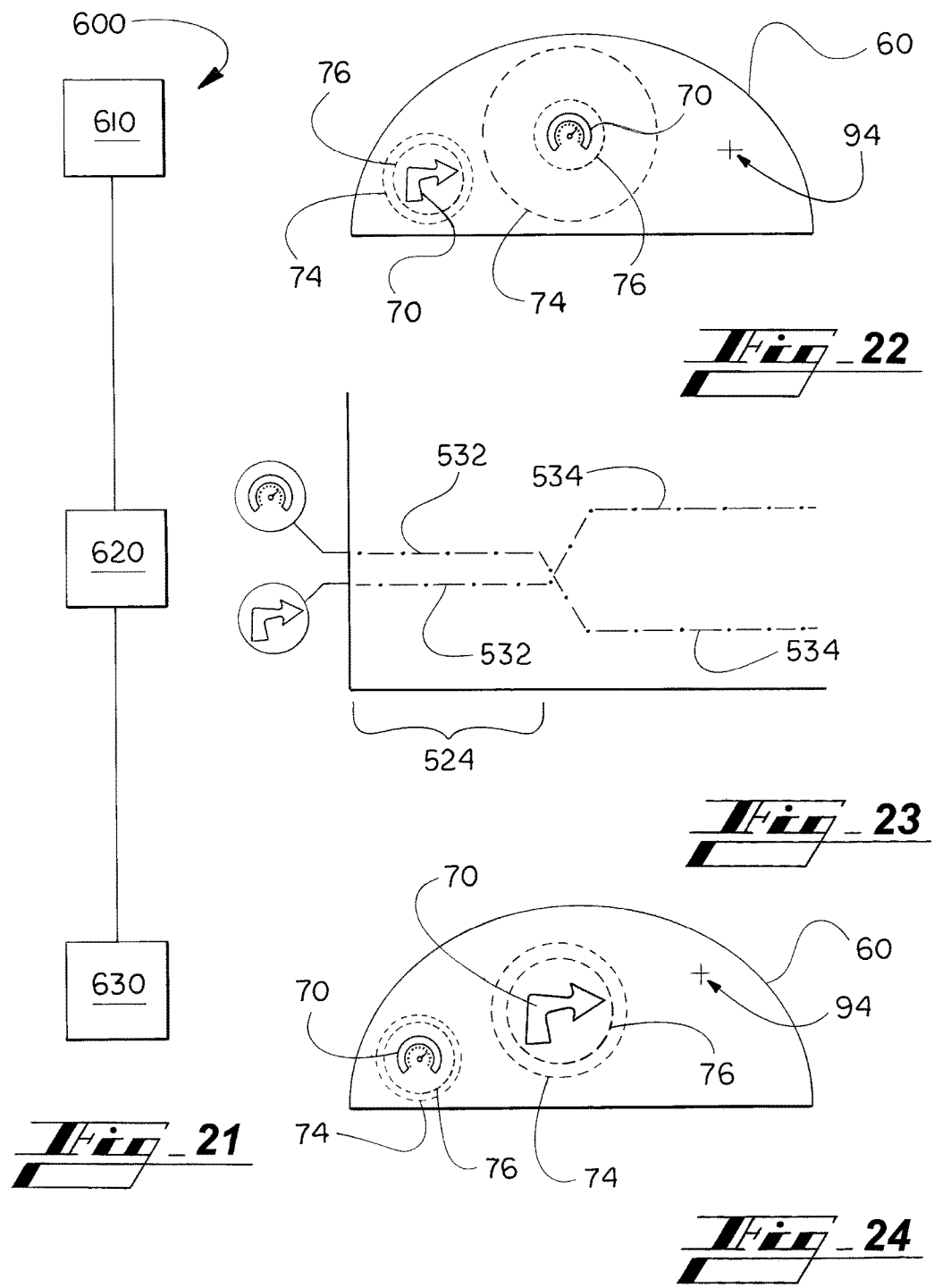

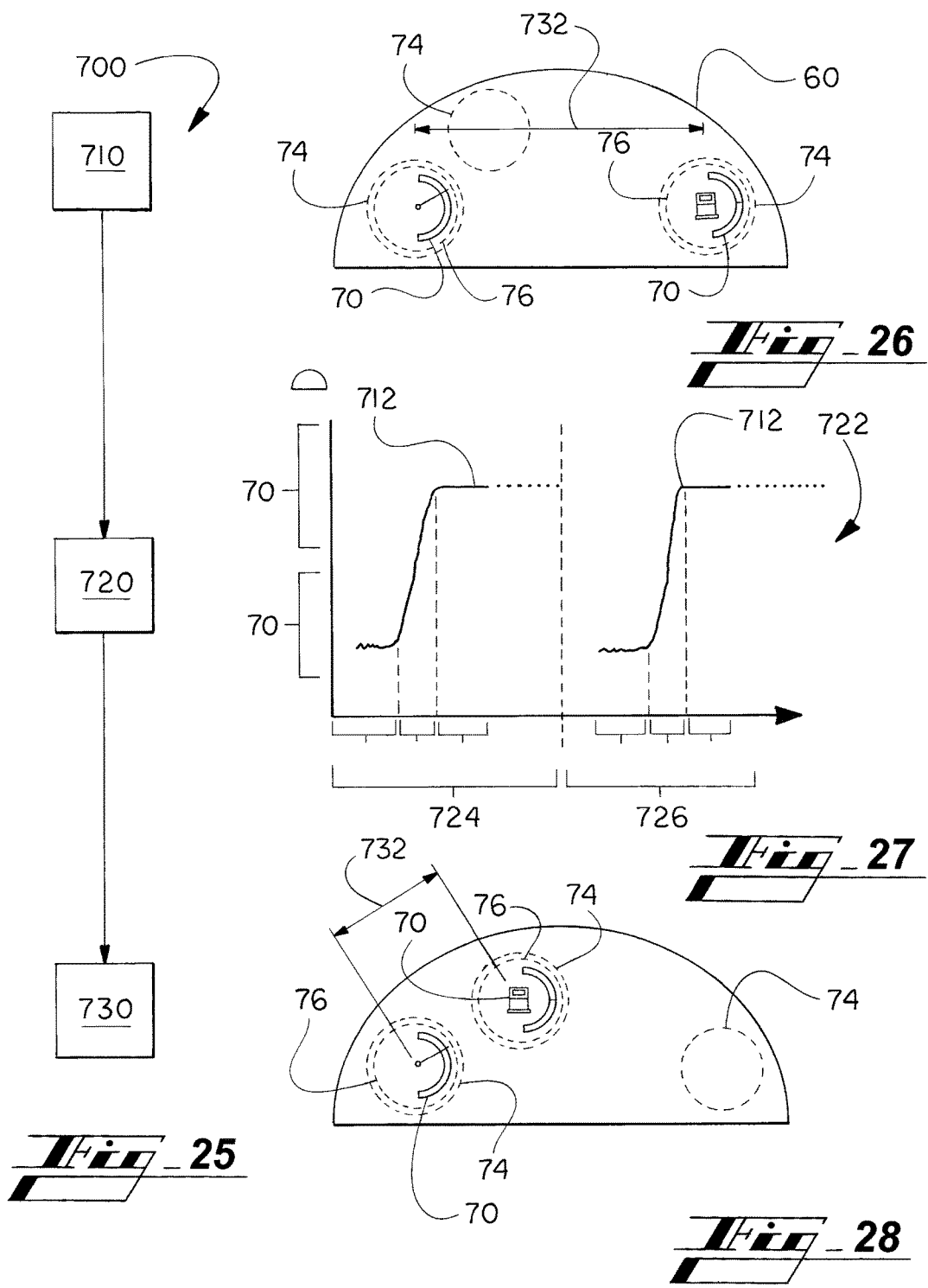

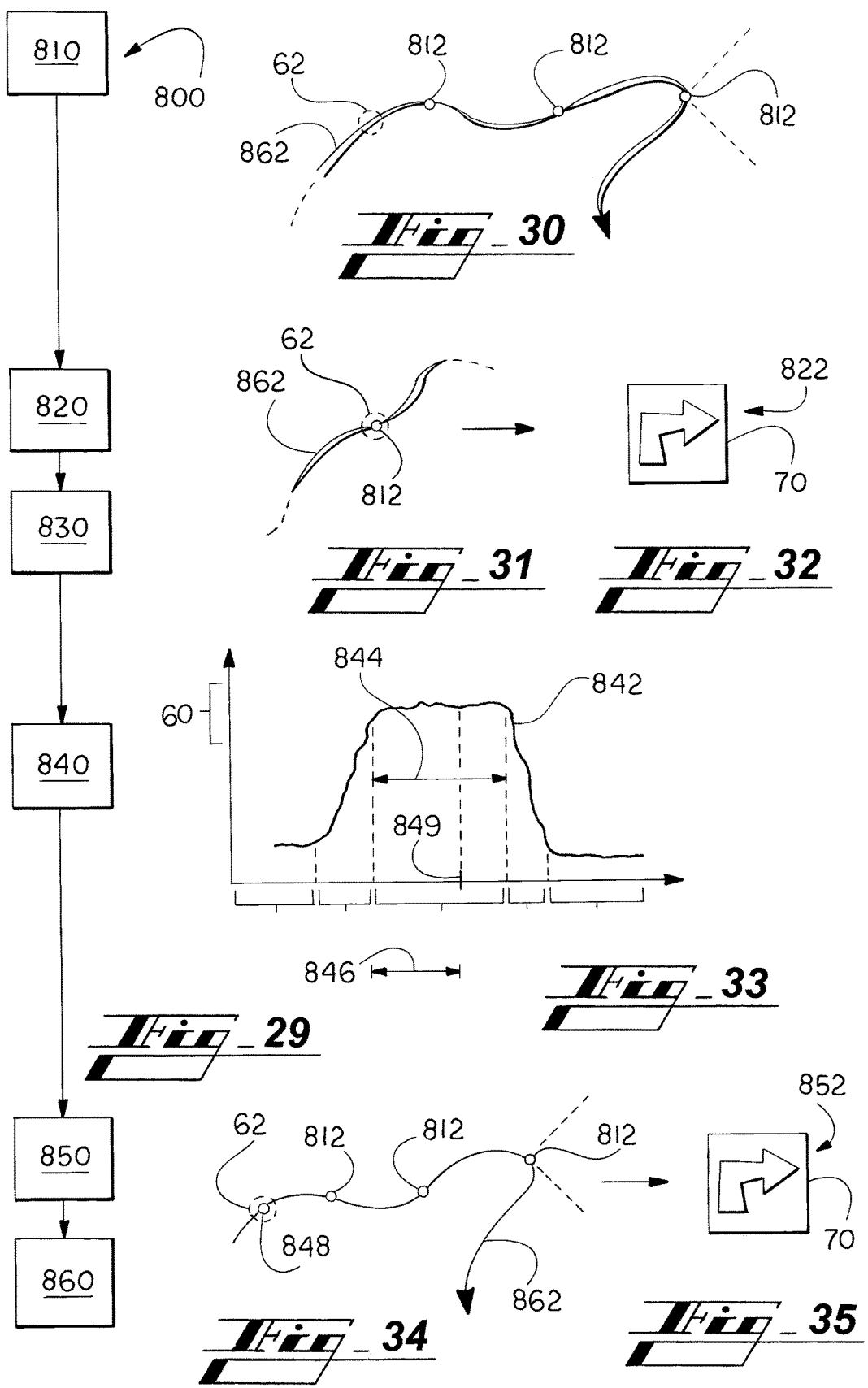

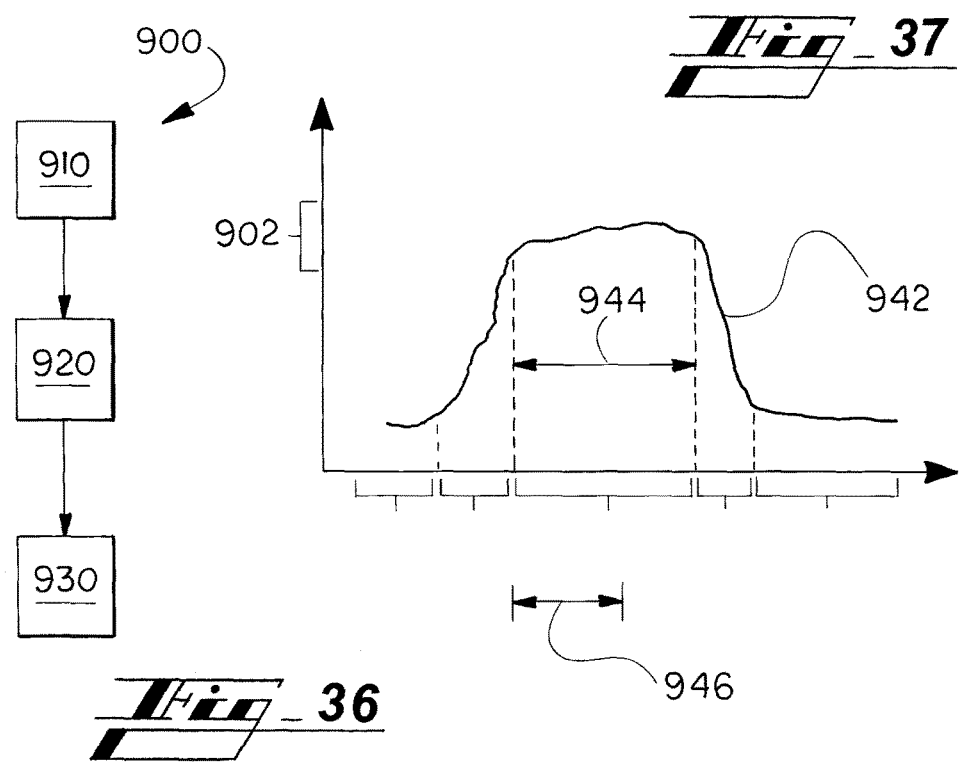
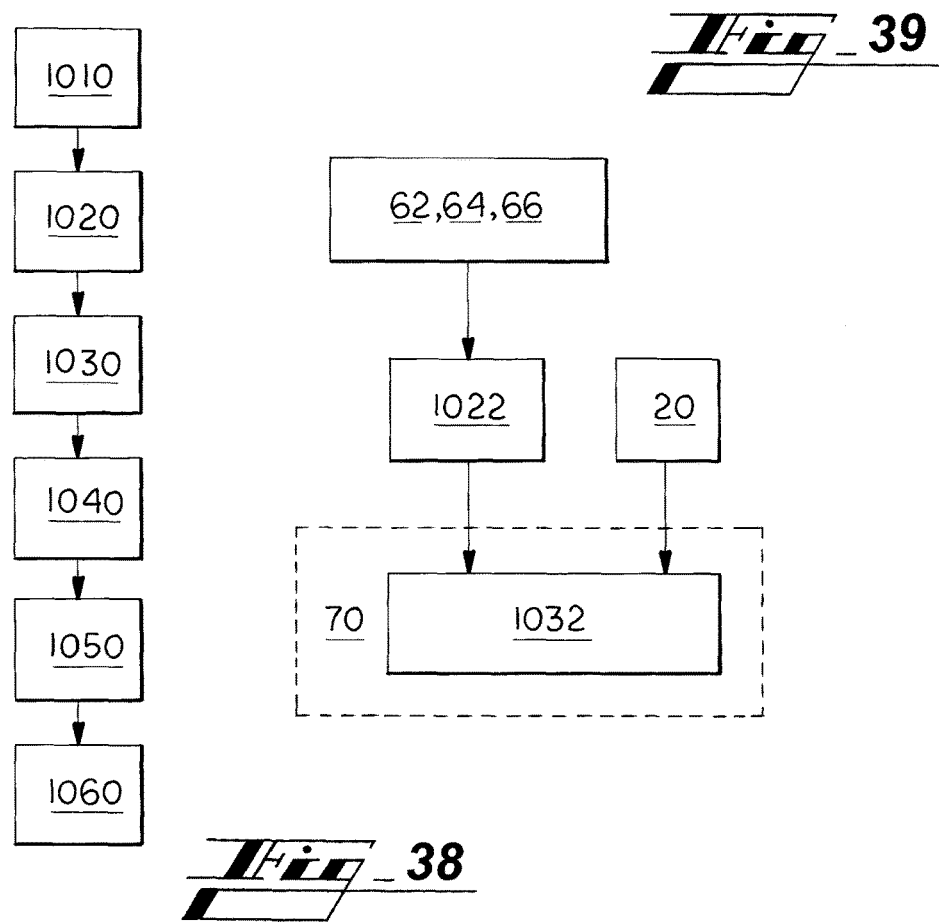

SYSTEMS AND METHODS FOR USE AT A VEHICLE INCLUDING AN EYE TRACKING DEVICE

TECHNICAL FIELD

The present disclosure relates generally to systems and methods for use at a vehicle including an eye tracking device.

BACKGROUND

Conventional in-vehicle user interfaces and instrument clusters include complex displays having multiple visual outputs presented thereon. These displays require a relatively high amount of driver attention and, in some cases, the use of hands to interact with the user interfaces. Such displays could distract a driver resulting in less safe driving conditions.

SUMMARY

The present technology relates to systems and methods including an eye tracking device.

According to an exemplary embodiment, a method includes displaying an indicator on a display of a vehicle. The indicator includes an indicator area and is associated with a vehicle system. The method further includes comparing sensor data to a threshold. The sensor data is associated with the vehicle system. The threshold represents a separation between a first state or operation, e.g., a normal state, of the vehicle system and a second state or operation, e.g., a critical state, of the vehicle system. The method further includes comparing gaze location data to the indicator area; and reducing a prominence of the indicator if: the sensor data is on a normal state side of the threshold; and the gaze location data is found in the indicator area.

According to an exemplary embodiment, a method includes displaying an indicator on a display of a vehicle. The indicator includes an indicator area and is associated with a vehicle system. The method further includes comparing sensor data to a threshold. The sensor data is associated with the vehicle system. The threshold represents a separation between a normal state of the vehicle system and a critical state of the vehicle system. The method further includes comparing gaze location data to the indicator area; and increasing a prominence of the indicator if: sensor data is on a critical state side of the threshold; and gaze location data is not found in the indicator area.

According to an exemplary embodiment, a method includes receiving information to be communicated to a driver; and displaying a notification indicator on a display. The notification indicator includes an indicator area. The method further includes comparing gaze location data to the indicator area; and communicating the information if the gaze location data is found in the indicator area.

According to an exemplary embodiment, a method includes displaying a first indicator on a vehicle display. The first indicator includes a first indicator area. The method further includes calculating a first gaze frequency associated with the first indicator. The first gaze frequency is calculated over a first period of time and is based on one of: a number of times a gaze location moves into the first indicator area; and a time a gaze location spends in the first indicator area. The method further includes determining a prominence of the first indicator based on the first gaze frequency.

According to an exemplary embodiment, the method further includes displaying a second indicator on a vehicle display. The second indicator includes a second indicator area. The method further includes calculating a second gaze frequency associated with the second indicator. The second gaze frequency is calculated over a second period of time and is based on one of: a number of times a gaze location moves into the second indicator area; and a time a gaze location spends in the second indicator area. The method further includes determining the prominence of the second indicator based on the second gaze frequency. Positions on the display are ordered based on prominence. Determining the prominence includes determining the position of the first indicator and the second indicator based on an order of the first gaze frequency and the second gaze frequency.

According to an exemplary embodiment, a method includes displaying each of a first indicator and a second indicator on a display of a vehicle. The first indicator includes a first indicator area and the second indicator includes a second indicator area. A first distance separates the first indicator and the second indicator. The method further includes analyzing gaze location data on the display; and decreasing the first distance if a gaze pattern between the first indicator and the second indicator is identified. The gaze pattern is based on a number of transitions between the first indicator and the second indicator.

According to an exemplary embodiment, a method includes accessing a set of default parameter values; and comparing the set of default parameter values to output data from a sensor. The sensor is associated with a vehicle system of a vehicle. The method further includes communicating, if the output data matches one of the set of default parameter values, default information associated with the one of the set of default parameter values; registering a gaze associated with the vehicle system if gaze location data is found at a location associated with the vehicle system; determining, at a time when the gaze is registered, an auxiliary parameter; generating auxiliary information based on the auxiliary parameter; and communicating the auxiliary information.

According to an exemplary embodiment, a method includes registering a gaze associated with a vehicle system if gaze location data is found at a location associated with the vehicle system; and communicating, at a time when the gaze is registered, information associated with the vehicle system.

The method further includes determining a context based on sensor data; and determining the information associated with the vehicle system based on the context.

DESCRIPTION OF THE DRAWINGS

FIG. 2 illustrates a schematic illustration of a display of the vehicle of FIG. 1.

FIG. 3 illustrates a computing device of the vehicle of FIG. 1.

FIG. 4 illustrates a declutter method according to a declutter application of the computing device of FIG. 3.

FIGS. 5-7 schematically illustrate the declutter method of FIG. 4.

FIG. 8 illustrates a system notification method according to a system notification application of the computing device of FIG. 3.

FIGS. 9-11 schematically illustrate the system notification method of FIG. 8.

FIG. 12 illustrates a delayed notification method according to a delayed notification application of the computing device of FIG. 3.

FIGS. 13-15 schematically illustrate the delayed notification method of FIG. 12.

FIG. 16 illustrates a driver request method according to a driver request application of the computing device of FIG. 3.

FIGS. 17-20 schematically illustrate the driver request method of FIG. 16.

FIG. 21 illustrates an arrangement method according to an arrangement application of the computing device of FIG. 3.

FIGS. 22-24 schematically illustrate the arrangement method of FIG. 21.

FIG. 25 illustrates a relationship method according to a relationship application of the computing device of FIG. 3.

FIGS. 26-28 schematically illustrate the relationship method of FIG. 25.

FIG. 29 illustrates an information adjustment method according to an information adjustment application of the computing device of FIG. 3.

FIGS. 30-35 schematically illustrate the information adjustment method of FIG. 29.

FIG. 36 illustrates a vehicle system information method according to a vehicle system information application of the computing device of FIG. 3.

FIG. 37 schematically illustrates the vehicle system information method of FIG. 36.

FIG. 38 illustrates a driver context information method according to a driver context information application of the computing device of FIG. 3.

FIG. 39 schematically illustrates the driver context information method of FIG. 38.

Figure 1:
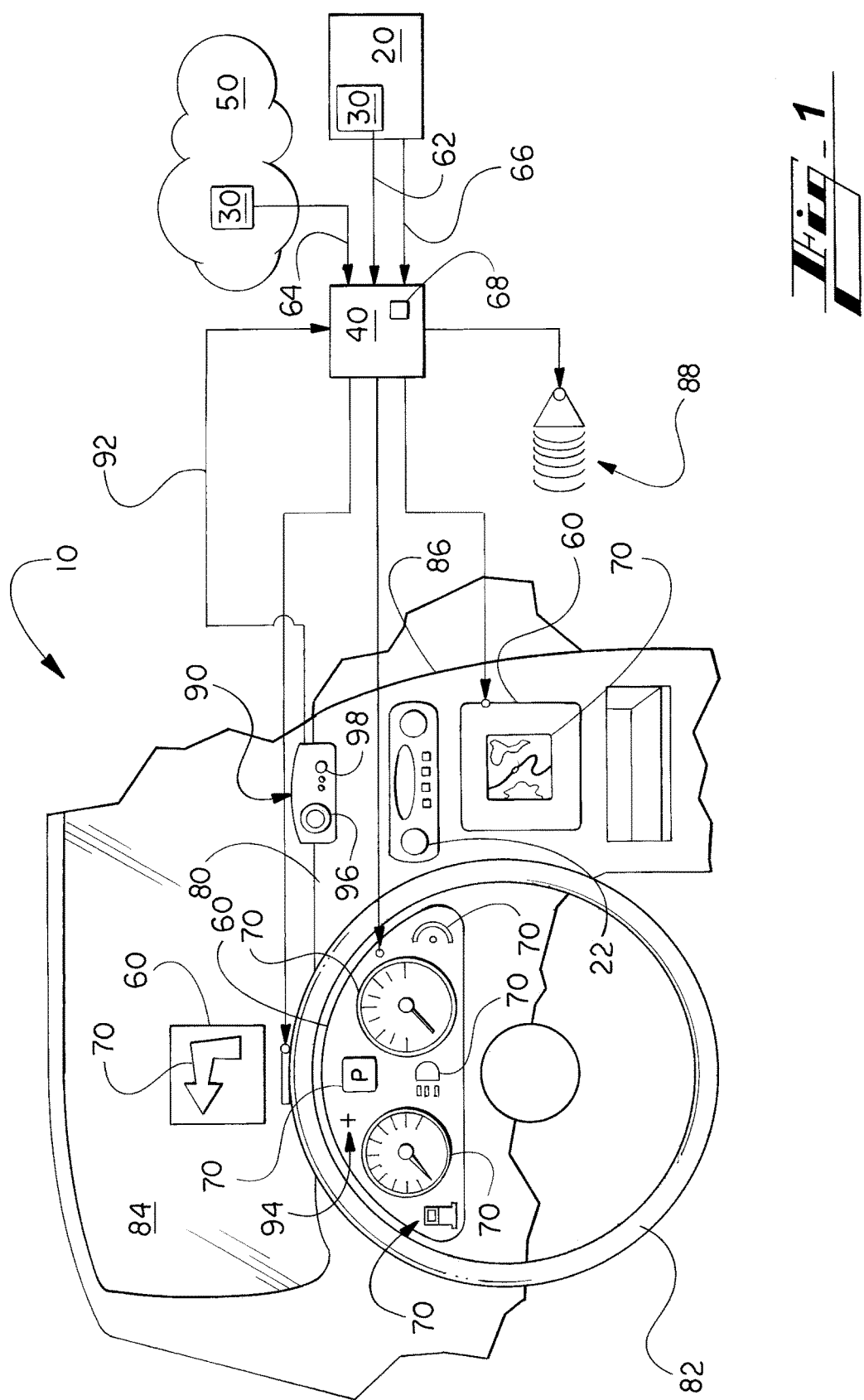
FIG. 1 illustrates a partial view of a vehicle, according to an embodiment of the present disclosure.

The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

DETAILED DESCRIPTION

As required, detailed embodiments of the present disclosure are disclosed herein. The disclosed embodiments are merely examples that may be embodied in various and alternative forms, and combinations thereof. As used herein, for example, "exemplary," and similar terms, refer expansively to embodiments that serve as an illustration, specimen, model or pattern.

While the present technology is described primarily herein in connection with automobiles, the technology is not limited to automobiles. The concepts can be used in a wide variety of applications, such as in connection with aircraft, marine craft, and other vehicles.

According to an embodiment illustrated in FIG. 1, a vehicle 10 includes vehicle systems 20, controls 22 for the vehicle systems 20, sensors 30, a computing device 40, and displays 60. Certain of the sensors 30 are configured to output data 62 reflecting measurements of parameters of the vehicle systems 20. Certain of the sensors 30 are configured to output data 64 reflecting measurements of an environment 50 of the vehicle 10.

Vehicle systems 20 are also configured to output data 66 or otherwise provide another source of information. For example, the output data 66 is generated by the vehicle system 20. Vehicle systems 20 that generate output data 66 include electronic control units.

Also, information (e.g., information 68) from vehicle system 20 is available on a controller area network (CAN) Bus. For example, whether or not the automatic cruise control (ACC) is engaged, the CAN bus includes information about whether the radio is on and at what volume. The CAN bus also includes personalization information that is available to all vehicle systems 20 that indicates the identity of the driver and their preferences.

The computing device 40 is configured to receive the output data 62, 64, 66. The computing device 40 is configured to store the output data 62, 64, 66 as information 68 or to generate the information 68 based on the output data 62, 64, 66.

The computing device 40 is further configured to communicate with a driver via a vehicle-user interface such as the displays 60, an audio (e.g., speaker/microphone) system 88, or a haptic system (e.g., in the steering wheel 82). For example, to communicate the information 68 visually, the computing device 40 is configured to generate and position indicators 70 on the displays 60 or generate and position text on the displays 60. To communicate the information 68 audibly, the computing device 40 is configured to generate an audio signal based on the information 68 and play the audio file through the audio system 88.

The display 60 is a visual output. For example, the display 60 can be a two-dimensional output or a three-dimensional output. Two-dimensional output includes an electronic output on a screen or a projection onto a surface. Three-dimensional outputs include holographic projections.

For purposes of teaching, a device with a display 60 is described in detail below as including an electronic screen on which digital output is displayed. For example, the indicators 70 are digital images that are positioned on the display 60 by the computing device 40.

Referring to FIG. 2, the display 60 includes display areas 74 at positions 72. Here, each of the indicators 70 is associated with one of the display areas 74 of the display 60. Each of the indicators 70 includes an indicator area 76. For example, the indicator area 76 is less than or equal to the associated display area 74 and is scaled as described in further detail below. Alternatively described, the indicators are targets and the indicator areas are target regions.

The display 60 can be that of an instrument panel, a human-machine interface (HMI), an entertainment or infotainment system (e.g., radio, video playing systems), a navigation system, a system that connects to auxiliary devices (e.g., bluetooth devices, cellular phones, or any other system brought into the vehicle—here, information is presented for example by a smartphone projection or smartphone connection) or the auxiliary device itself, a head up display (HUD) (e.g., that is projected onto a windshield of the vehicle), other devices for providing visual communication, and the like.

Referring to FIG. 1, for purposes of teaching, the display 60 is positioned in a dashboard 80 of the vehicle 10 behind the steering wheel 82. In some embodiments, a display includes one or more screens, projections, and the like. For example, a display 60 can include a first display 60 behind the steering wheel 82, a second display 60 (e.g., a HUD) projected onto the windshield 84 of the vehicle 10, and a third display 60 in the center of the dashboard 80 (e.g., center console 86). Although a display can include physically separate components, the components can be treated as a single display. Otherwise, the components can operate as individual displays or different displays can be formed from different components.

In certain embodiments, the indicators 70 represent a state or condition of the vehicle systems 20 or environment 50. Commonly, indicators 70 include gauges such as a speedometer, tachometer, odometer, and fuel gauge. Other indicators 70 include a gearshift position, a seat belt warning light, a parking-brake-engagement warning light, and an engine-malfunction light, low fuel, low oil pressure, low tire pressure, and faults in the airbag (SRS) system.

Other indicators 70 can relate to vehicle systems 20 such as heating systems, air conditioning systems, braking systems, acceleration systems, entertainment or infotainment systems (e.g., radio, video playing systems), navigation systems, mirrors (e.g., mirror adjustment systems), seats (e.g., seat adjustment systems), window control systems, doors (e.g., door lock control systems), collision-avoidance systems, traction control systems, a horn, windshield wiper systems, belts and hoses, emission system, engine, engine cooling system, exhaust system, lighting and wipers, starting, charging, and batteries, steering and suspension, transmission, sensors, switches, HVAC, cameras, communication devices (e.g., OnStar® devices and other wireless communication devices), systems that connect to auxiliary devices (e.g., Bluetooth devices, cellular phones), cluster, center stack, head up display (HUD), speech, gestures, sound, and the like.

Similarly, controls 22 relate to vehicle systems 20.

Continuing with FIGS. 1 and 2, the vehicle 10 further includes a gaze detection device 90 that is configured to output gaze location data 92 reflecting a gaze location 94 over time. For example, the gaze location 94 is the location of a gaze of a driver on the display 60.

For example, the gaze detection device 90 detects a gaze location 94 based on the position of the user's eye, the position of the display 60, and a direction of the eye. Here, the gaze location 94 is where a vector, intersecting the position of the user's eye and having the angle of the direction of the user's eye, intersects the plane of the surface of the display 60. The position of the user's eye depends on, for example, a head pose.

According to an exemplary embodiment, the gaze detection device 90 includes a camera 96 that is configured to capture an image of at least a portion of a head (e.g. face or eyes) of the user and to generate a signal representing the image. The gaze detection device 90 also includes a source of radiant energy, such as an infra-red light emitting diode 98, to illuminate at least a portion of the head of the user. In certain embodiments, more than one camera is used for eye tracking to improve the accuracy of the gaze detection device 90.

The gaze detection device 90 is configured to analyze the images captured by the camera 96 to determine the position of the eye and the gaze angle. For example, the gaze detection device 90 includes a computing device similar to the computing device 40 described below and an analysis application for processing the images.

Alternatively the gaze detection device 90 provides the images to the computing device 40 and the computing device 40 includes an analysis application to analyze the images.

For purposes of teaching, gaze location data described below is illustrated as gaze locations 94 measured over time (x-axis). Gaze location data moves along a y-axis to illustrate the movement of the gaze location 94 between various locations in the vehicle 10 (e.g., locations on the display 60). Areas that include a number of locations in the vehicle 10 are indicated by a range on the y-axis.

In the figures, time periods of fixation at a certain location are indicated by a flat line. Time periods of transition between locations in different areas are indicated by a sloped line. Time periods of saccades between different locations in the same area are indicated by sloped line that remains in an area.

FIG. 3 illustrates the computing device 40 of the vehicle 10 of FIG. 1. In certain embodiments, the computing device 40 includes an application programming interface (API) and a user interface (UI) generator. In certain embodiments, the computing device is or includes that of a smartphone.

The computing device 40 includes a processor 100 for controlling and/or processing data, input/output data ports 102, and a memory 110. The processor could be multiple processors, which could include distributed processors or parallel processors in a single machine or multiple machines. The processor could include virtual processor(s). The processor could include a state machine, application specific integrated circuit (ASIC), programmable gate array (PGA) including a Field PGA, or state machine. When a processor executes instructions to perform "operations," this could include the processor performing the operations directly and/or facilitating, directing, or cooperating with another device or component to perform the operations.

The computing device 40 can include a variety of computer-readable media, including volatile media, non-volatile media, removable media, and non-removable media. The term "computer-readable media" and variants thereof, as used in the specification and claims, includes storage media. Storage media includes volatile and/or non-volatile, removable and/or non-removable media, such as, for example, RAM, ROM, EEPROM, flash memory or other memory technology, CDROM, DVD, or other optical disk storage, magnetic tape, magnetic disk storage, or other magnetic storage devices or any other medium that is configured to be used to store information that can be accessed by the computing device 40.

While the memory 110 is illustrated as residing proximate the processor 100, it should be understood that at least a portion of the memory can be a remotely accessed storage system, for example, a server on a communication network (e.g. a remote server), a remote hard disk drive, a removable storage medium, combinations thereof, and the like. Thus, any of the data, applications, and/or software described below can be stored within the memory and/or accessed via network connections to other data processing systems (not shown) that may include a local area network (LAN), a metropolitan area network (MAN), or a wide area network (WAN), for example.

The memory 110 includes several categories of software and data used in the computing device 40, including, applications 120, a database 130, an operating system 140, and input/output device drivers 150.

As will be appreciated by those skilled in the art, the operating system 140 may be any operating system for use with a data processing system. The input/output device drivers 150 may include various routines accessed through the operating system 140 by the applications to communicate with devices, and certain memory components. The applications 120 can be stored in the memory 110 and/or in a firmware (not shown) as executable instructions, and can be executed by the processor 100.

The applications 120 include various programs that, when executed by the processor 100, implement the various features of the computing device 40, including declutter applications, system notification applications, delayed notification applications, driver request applications, arrangement applications, relationship applications, information adjustment applications, vehicle system information applications, and driver context information applications, each of which is described in further detail below. The applications 120 are stored in the memory 110 and are configured to be executed by the processor 100.

The applications 120 may be applied to data stored in the database 130, such as that of signals received by the sensors 30 (e.g., received via the input/output data ports 102 along with data received over a wireless data connection). The database 130 represents the static and dynamic data used by the applications 120, the operating system 140, the input/output device drivers 150 and other software programs that may reside in the memory 110.

It should be understood that FIG. 3 and the description above are intended to provide a brief, general description of a suitable environment in which the various aspects of some embodiments of the present disclosure can be implemented. The terminology "computer-readable media", "computer-readable storage device", and variants thereof, as used in the specification and claims, can include storage media. Storage media can include volatile and/or non-volatile, removable and/or non-removable media, such as, for example, RAM, ROM, EEPROM, flash memory or other memory technology, CDROM, DVD, or other optical disk storage, magnetic tape, magnetic disk storage, or other magnetic storage devices or any other medium, excluding propagating signals, that can be used to store information that can be accessed by the device shown in FIG. 3.

While the description refers to computer-readable instructions, embodiments of the present disclosure also can be implemented in combination with other program modules and/or as a combination of hardware and software in addition to, or instead of, computer readable instructions.

While the description includes a general context of computer-executable instructions, the present disclosure can also be implemented in combination with other program modules and/or as a combination of hardware and software. The term "application," or variants thereof, is used expansively herein to include routines, program modules, programs, components, data structures, algorithms, and the like. Applications can be implemented on various system configurations, including single-processor or multiprocessor systems, minicomputers, mainframe computers, personal computers, hand-held computing devices, microprocessor-based, programmable consumer electronics, combinations thereof, and the like.

FIGS. 4-39 illustrate methods and applications according to embodiments of the present disclosure. Applications includes computer-executable instructions that, when executed by the processor 100, cause the processor 100 to perform the associated method.

It should be understood that the steps of methods are not necessarily presented in any particular order and that performance of some or all the steps in an alternative order is possible and is contemplated. The steps have been presented in the demonstrated order for ease of description and illustration. Steps can be added, omitted and/or performed simultaneously without departing from the scope of the appended claims.

It should also be understood that the illustrated methods can be ended at any time. In certain embodiments, some or all steps of this process, and/or substantially equivalent steps are performed by execution of computer-readable instructions stored or included on a computer readable medium, such as the memory 110 of the computing device 40 described above, for example.

Referring to FIGS. 4-7, the declutter application 120 includes computer-readable instructions that, when executed by the processor 100, cause the processor 100 to perform a declutter method 200.

At a block 210, the processor 100, displays (e.g., facilitates display of) an indicator 70, as shown in FIG. 5, and analyzes sensor data 212 (e.g., horizontal x-axis is time) from the sensor 30—sensor 30 shown in FIG. 1 and sensor data 212 shown in FIG. 6.

Continuing with FIG. 6, if the sensor data 212 is on a normal operation side of (e.g., above or below) a threshold 214, at a block 220, the processor 100 analyzes gaze location data (e.g., gaze locations 94 measured over time, movement between a gaze location 94 outside the indicator area 76 to a gaze location 94 inside the indicator area 76 is represented by arrow 222). For example, the threshold 214 represents separation between a first operation, e.g., a normal operation and a second operation, e.g., a critical operation, of a respective one of the vehicle systems 20.

Referring again to FIG. 5, if the gaze location data includes a gaze location 94 in the indicator area 76 of the indicator 70 that is associated with the vehicle system 20 of the sensor 30, at a block 230, the processor 100 displays the indicator 70 such that the prominence of the indicator 70 is reduced. Reducing the prominence includes reducing size, brightness, color, font, type of indicator, moving to a less prominent position (e.g., away from the center of the display), combinations thereof, and the like.

As an example, referring to FIGS. 5-7, the processor 100 displays a fuel level indicator 70 and analyzes fuel level data 212 from the fuel level sensor 30. If the fuel level data 212 shows the fuel level is above a fuel level threshold 214, the processor 100 analyzes gaze location data. If the fuel level data 212 is greater than the fuel level threshold 214, the fuel level data 212 is acceptable and the information is not immediately important once the driver is aware of the fuel level. If the gaze location data includes a gaze location 94 in an indicator area 76 of the fuel level indicator 70, the driver has noticed the fuel level and the processor 100 reduces the prominence of the fuel level indicator 70 by changing the type of graphic used and/or reducing the size of the graphic.

Other examples include the method 200 where the engine temperature data 212 is measured by an engine temperature sensor 30 and compared to an engine temperature threshold 214 (e.g., the engine temperature threshold 214 defines a "yellow zone"); the method 200 where air pressure data 212 is measured by an air pressure sensor 30 in one of the wheels and compared to an air pressure threshold 214 (e.g., the air pressure threshold is a pressure that is low but not critical such as 28 PSI for a tire whose normal is 32 PSI); and the method 200 where oil life data 212 is measured by an oil life sensor 30 and compared to an oil life threshold 214 (e.g., the oil life exceeds 100% meaning that an oil change is needed). In these examples, engine temperature data 212 below the engine temperature threshold 214 is normal, air pressure data 212 above the air pressure threshold 214 is normal, and oil life data 212 below the oil life threshold 214 is normal.

Referring to FIGS. 8-11, the system notification application 120 includes computer-readable instructions that, when executed by the processor 100, cause the processor 100 to perform the system notification method 300.

At a block 310, the processor 100, displays an indicator 70 on the display 60 as shown in FIG. 9 and analyzes data 312 (e.g., horizontal x-axis is time) from a sensor 30 as shown in FIG. 10.

Continuing with FIG. 10, if the sensor data 312 is on a critical operation side of (above or below) a threshold 314, at a block 320, the processor 100 analyzes gaze location data (e.g., gaze locations 94 measured over time, movement between a gaze location 94 outside the indicator area 76 to a gaze location 94 inside the indicator area 76 is represented by arrow 322 as shown in FIG. 11). For example, the threshold 314 represents operation of a vehicle system 20 below which a warning is to occur.

Continuing with FIG. 9, at a block 330, if the gaze location data does not include a gaze location 94 in the indicator area 76 of the indicator 70, the processor 100 increases the prominence of the indicator 70. For example, the prominence of the indicator 70 is increased (e.g., at a rate or for a time) until gaze location data includes a gaze location 94 in the indicator area 76 of the indicator 70, which is associated with the vehicle system 20 of the sensor 30. Increasing the prominence includes increasing size, brightness, type of indicator, moving to a more prominent position 72 (e.g., toward the center of the display), combinations thereof, and the like.

As an example, referring to FIGS. 9-11, the processor 100 displays a fuel level indicator 70 and analyzes data 312 from the fuel level sensor 30. If the fuel level sensor data 312 shows the fuel level is below a fuel level threshold 314, the fuel level is not acceptable and the driver is to be notified. The processor 100 analyzes gaze location data. If the gaze location data does not include a gaze location 94 in an indicator area 76 of the fuel level indicator 70, the driver is unaware of the fuel level and the processor 100 increases the prominence of the fuel level indicator 70 by increasing the size of the graphic. Once the gaze location data includes a gaze location 94 in an indicator area 76 of the fuel level indicator 70, the driver has noticed the fuel level.

Other examples include the method 300 where the engine temperature data 212 is measured by an engine temperature sensor 30 and compared to an engine temperature threshold 214 (e.g., the engine temperature threshold 214 defines a "red zone"); the method 300 where air pressure data 212 is measured by an air pressure sensor 30 in one of the wheels and compared to an air pressure threshold 214 (e.g., the air pressure threshold is a pressure that is critical); and the method 300 where oil life data 212 is measured by an oil life sensor 30 and compared to an oil life threshold 214 (e.g., the oil life exceeds 125% meaning that an oil change is overdue). In these examples, engine temperature data 212 above the engine temperature threshold 214 is critical, air pressure data 212 below the air pressure threshold 214 is critical, and oil life data 212 above the oil life threshold 214 is critical.

As another example, road position data is compared to a lane (e.g., threshold) and a lane departure warning is communicated to the driver with haptic feedback until the driver looks at a warning indicator or indicator of a lane departure system.

Referring to FIGS. 12-15, the delayed notification application 120 includes computer-readable instructions that, when executed by the processor 100, cause the processor 100 to perform a delayed notification method 400.

Referring to FIG. 13, at a block 410, the processor 100 receives information 68 or generates the information 68. The processor 100 then generates and displays an indicator 70 that represents an awaiting notification, and analyzes gaze location data 412.

At a block 420, if the gaze location data (e.g., gaze locations 94 measured over time, movement between a gaze location 94 outside the indicator area 76 to a gaze location 94 inside the indicator area 76 is represented by arrow 412) includes a gaze location 94 in an indicator area 76 of the indicator 70, referring to FIG. 14, the processor 100 displays the information 68 (e.g., replaces the indicator 70 with the information 68). In alternative embodiments, the gaze location 94 is in the indicator area 76 for a certain amount of time before the information 68 is displayed.

The indicator 70 may be generated and displayed based on data from a sensor 30. For example, referring to FIG. 15, at the block 310, the processor 100 generates and displays an indicator 70 that represents an awaiting notification only if sensor data 422 (e.g., horizontal x-axis is time) is below a threshold 424. Alternatively or additionally, at the block 420, the processor 100 displays the information 68 only if sensor data 422 is below the threshold 424.

Here, the threshold 424 represents operation of a vehicle system 20 below which (or above which) a driver can receive the information 68 without substantially distracting or disturbing the driver. For example, the threshold 424 may be a speed, an amount of traffic, a time to next driving direction, etc.

As an example, referring to FIGS. 13-14, the processor 100 receives a message 68, generates and displays an indicator 70 (e.g., an envelope symbol) on the display 60, and analyzes gaze location data 412. If the gaze location data 412 includes a gaze location 94 in an indicator area 76 of the indicator 70, the processor 100 displays the message 68 on the display 60. In certain embodiments, for example, the processor 100 only displays the indicator 70 if the speed is measured by a speed sensor 30 to be below ten miles per hour.

Referring to FIGS. 16-20, the driver request application 120 includes computer-readable instructions that, when executed by the processor 100, cause the processor 100 to perform the driver request method 500.

At a block 510, referring to FIGS. 17 and 18, the processor 100 displays the indicators 70 and analyzes gaze location data 512.

At a block 520, referring to FIGS. 18 and 19, a gaze, or glance, frequency 522 is calculated for each of the indicators 70. The gaze frequency 522 for an indicator 70 is the number of times a gaze location 94 moves into the indicator area 76 (e.g., transitions T) of the indicator 70 over a time period 524. In alternative embodiments, the gaze frequency 522 is time a gaze location 94 spends in the indicator area 76 (e.g., dwell time equals sum of all fixations and saccades between transitions or shifts of gaze to other target areas) over the time period 524. Glance duration can be defined as the time from the moment at which the direction of gaze moves toward a target to the moment it moves away from it. A single glance duration may be referred to as a glance.

The gaze frequency can also be defined as the number of glances to a target within a pre-defined sample time period, or during a pre-defined task, where each glance is separated by at least one glance to a different target.

At a block 530, referring to FIGS. 19 and 20, the prominence of each indicator 70 is increased or decreased based on the respective calculated gaze frequency 522 of the indicator 70. For example, a prominence of each indicator 70 is associated with an average gaze frequency 532. If the calculated gaze frequency 522 is above the average gaze frequency 532, the processor 100 increases the prominence of the indicator 70. If the calculated gaze frequency 522 is below the average gaze frequency 532, the processor 100 decreases the prominence of the indicator 70.

In certain embodiments, average gaze frequency 532 is the gaze frequency 522 that is calculated over a longer time period.

Referring to FIGS. 21-24, the arrangement application 120 includes computer-readable instructions that, when executed by the processor 100, cause the processor 100 to perform the arrangement method 600.

According to the arrangement method 600, indicators 70 with greater average gaze frequency 532, 534 are displayed at more prominent positions 72 that have and displayed towards the center of the display 60 or at the most prominent position.

Referring to FIGS. 22 and 23, at a block 610, the processor 100 displays the indicators 70 based on previously calculated average gaze frequency 532 (e.g., long-term average) and analyzes gaze location data 512. Referring momentarily to FIGS. 19 and 23, for each indicator 70, the processor 100 calculates a current gaze frequency 522 (e.g., the number of gaze locations 94 in the indicator area 76 of the indicator 70 or the time that the gaze location 94 is in the indicator area 76 of the indicator 70 over the last one minute 524) and calculates an updated average gaze frequency 534 based on the current gaze frequency 522.

At a block 620, referring to FIG. 23, the processor 100 analyzes the updated average gaze frequencies 534 of the indicators 70.

At a block 630, referring to FIG. 24, the processor 100 arranges the indicators 70 in the display areas 74 at the positions 72 based on the updated average gaze frequencies 534. For example, positions 72 on the display 60 and size ranges at those positions 72 are predefined and ranked by prominence (i.e., position 72 and display area 74).

Generally, the indicators 70 with the larger updated average gaze frequencies 534 are arranged in positions 72 with a relatively larger size range (e.g., the size of indicator area 76 within display area 74 is determined based on current gaze frequency 522 as described above with respect to method 500) at a more central (or easy to find) position 72 on the display 60. Similarly, the indicators 70 with the smaller updated average gaze frequencies 534 are arranged in positions 72 with a relatively smaller size range (e.g., the size of indicator area 76 within display area 74 is determined based on current gaze frequency 522 as described above with respect to method 500) and a less central position 72 on the display 60.

In certain embodiments, a HUD includes a most prominent position 72.

Referring to FIGS. 25-28, the relationship application 120 includes computer-readable instructions that, when executed by the processor 100, cause the processor 100 to perform the relationship method 700.

At a block 710, referring to FIG. 26, the processor 100 displays the indicators 70 and analyzes gaze location data 712 (e.g., horizontal x-axis is time).

At a block 720, referring to FIG. 27, a gaze pattern 722 is identified. For example, the gaze pattern 722 is identified when a gaze location 94 is found in the indicator area 76 of at least two different ones of the indicators 70 in at least two different time periods 724, 726. Alternatively, a gaze pattern 722 is identified when a number of transitions between two indicators 70 is greater than a threshold number of transitions.

At a block 730, referring to FIG. 28, if a gaze pattern 722 is identified, the processor 100 decreases a distance 732 between the indicators 70 associated with the gaze pattern 722 or otherwise combines the indicators 70 associated with the gaze pattern 722.

Referring to FIGS. 29-35, the information adjustment application 120 includes computer-readable instructions that, when executed by the processor 100, cause the processor 100 to perform the information adjustment method 800. According to the information adjustment method 800, default information is augmented with auxiliary information or otherwise altered based on a gaze of a driver.

The information 68 to be communicated by the computing device 40 may be static (e.g., fixed or predetermined content already in memory) or may be dynamic (e.g., may change over time). Dynamic information includes, for example, time of day, weather, and driver state.

The information 68 may be generated and stored to be accessed by the computing device 40. Alternatively, the computing device 40 may generate the information 68 in real-time or request that the vehicle system 20 generate the information 68 in real-time. For purposes of teaching, information 68 is categorized below as default information and auxiliary information.

The memory 110 includes set of default parameter values 812. Exemplary parameters include location, distance, and time.

At a block 810, the processor 100 monitors the output data 62 of a sensor 30 or vehicle system 20. The output data 62 includes values of a parameter associated with the set of default parameter values 812. The processor 100 compares the output data 62 of the sensor 30 to the set of default parameter values 812.

When the output data 62 of the sensor 30 matches one of the set of default parameter values 812 (e.g., FIG. 31), at a block 820, the processor 100 accesses, generates, or requests a default information 822 based on the matched one of the set of default parameter values 812 (e.g., FIG. 32). For example, the processor 100 accesses or generates the default information 822 associated with the matched one of the set of default parameter values 812; or requests that the default information 822 is generated by the vehicle system 20 and receives the default information 822.

At a block 830, the processor 100 communicates the default information 822 to the driver. For example, the communication is visual on the display 60 and/or audible through the audio system 88 of the vehicle 10.

At a block 840, the processor 100 analyzes gaze location data 842 (e.g., horizontal x-axis is time) to monitor a gaze location 94 of a driver (e.g., FIG. 33). If the gaze location 94 is on the display 60 (e.g., HMI) for a time 844 that is greater than a threshold time 846, a gaze is registered and the processor 100 generates an auxiliary parameter value 848 at a time 849 the gaze is registered (e.g., FIG. 34). Alternatively described, the auxiliary parameter value 848 modifies (e.g., is added to) the set of default parameter values 812.

Alternatively, a gaze is registered if a gaze frequency exceeds a certain threshold. Gaze frequency is the number of times a gaze location 94 is on the display 60 over a time period as described above with respect to gaze frequency 522.

At a block 850, the processor 100 generates (or requests generation of) an auxiliary information 852 based on the auxiliary parameter value 848 (e.g., FIG. 35).

At a block 860, the auxiliary information 852 is communicated to the driver. For example, the auxiliary information 852 is communicated visually on the display 60 and/or audibly through the audio system 88 of the vehicle 10.

In this manner, the computing device 40 responds to the gaze location 94 of a driver by increasing the communication of information 68 to the driver. For example, the frequency of communication of information 68 is increased by communicating the auxiliary information 852 in addition to the default information 822.

In certain embodiments, a gaze triggers the use, in place of the set of default parameters values 812, of a new set of parameter values. The new set of parameter values causes more frequent communication to be provided to the driver as compared to the set of default parameter values 812. For example, the new set of parameter values is a more full set of parameter values (or otherwise increases the number of the set of default parameter values 812).

In certain embodiments, if a gaze of a driver is not found in gaze location data during a period of time, the absence of a gaze reduces the default communication to the driver. For example, the absence of a gaze triggers the use, in place of the set of default parameter values 812, of a new set of parameter values. The new set of parameter values causes less frequent communication to be provided to the driver as compared to the set of default parameter values 812. For example, new set of parameter values is a more sparse set of parameters (or otherwise reduces the number of the set of default parameter values 812).

Referring to FIGS. 30-35, an example application is now described. Here, the information 68 is a direction that is associated with a parameter (e.g., locations, including locations based on geographical or temporal parameters) along a route 862. The route 862 is generated by the computing device 40 or the vehicle system 20, one or both of which is a navigation system.

For purposes of teaching, the parameter is a location. Default location values 812 can be determined in various ways. For example, the default location values 812 can be based on relative distance to a turn or other direction along the route 862; or the time to a turn or other direction along the route 862 given the relative distance to the turn and the current speed of the vehicle.

The sensor 30 (e.g., of the navigation system 20) is a location sensor 30, the output data 62 of which is the vehicle location 62.

Referring to FIG. 30, the processor 100 monitors the vehicle location 62 and compares the vehicle location 62 to the set of default location values 812.

Referring to FIGS. 31 and 32, when the vehicle location 62 matches one of the set of default location values 812, the processor 100 generates a default direction 822 based on the matched one of the set of default location values 812. The processor 100 communicates the default direction 822 to the driver.

Referring to FIGS. 33 and 34, the processor 100 analyzes gaze location data 842 to monitor a gaze from a driver. If a gaze location 94 is on the display 60 for a time 844 that is greater than a threshold time 846, a gaze is registered and the processor 100 generates an auxiliary location value 848 at the time 849 the gaze is registered.

Referring to FIGS. 34 and 35, the processor 100 generates (or requests generation of) an auxiliary direction 852 based on the auxiliary location value 848. For example, the auxiliary direction 852 is the next turn. Here, the turn would have been presented later based on a next one of default location values 812 but is instead presented now because of the auxiliary location value 848.

Alternatively, the auxiliary direction 852 is general information such as "I am working properly, your next turn will be presented in 10 seconds." Here, the next turn is presented in ten seconds when the next one of the set of default parameter values 812 matches the location of the vehicle 10.

In this manner, the computing device 40 responds to the gaze of a driver by increasing the communication of directions 68 to the driver. For example, the frequency of communication of directions 68 is increased by communicating the auxiliary direction 852 in addition to the default directions 822.

One advantage of this technology is that the computing device 40 responds to a driver that is having a new experience and is not calm (e.g., as evidenced by a gaze) by adjusting the default communication to include more frequent instructions or general messages. For example, a new experience is driving a route that a driver has not previously driven. Alternatively, if a driver is driving a common route, then the lack of gazes reflects the comfort of the driver. In response, the computing device 40 includes less frequent instructions (e.g., the default directions) and/or limiting messages to only important alerts (e.g., accidents, hazards, changes in traffic).

Referring to FIGS. 36-37, the vehicle system information application 120 includes computer-readable instructions that, when executed by the processor 100, cause the processor 100 to perform the vehicle system information method 900. According to the vehicle system information method 900, information 68 associated with a vehicle system 20 is presented when a user gazes for a period of time at a location 902 associated with the vehicle system 20.

The information 68 to be communicated by the computing device 40 may be static (e.g., fixed or predetermined) or may be dynamic (e.g., may change over time). The information 68 may be generated and stored to be accessed by the computing device 40. Alternatively, the computing device 40 may generate the information 68 in real-time or request that the vehicle system 20 generate the information 68 in real-time. The location 902 associated with the vehicle system 20 includes the indicator 70 associated with the vehicle system 20, the controls 22 associated with the vehicle system 20, and a designated location in the vehicle 10 (e.g., on the dashboard 80, steering wheel 82, or center console 86).

At a block 910, the processor 100 analyzes gaze location data 942 (e.g., horizontal x-axis is time) to monitor a gaze location 94 of a driver. If the gaze location 94 is at the location associated with a vehicle system 20 for a time 944 that is greater than a threshold time 946, at a block 920, a gaze is registered and, at a block 930, the processor 100 communicates the information 68 visually on the display 60 and/or audibly through the audio system 88 of the vehicle 10.

Using an automatic cruise control (ACC) system 20 as an example of a vehicle system 20, the ACC system 20 is activated when the ACC system 20 is turned on and when a speed is set using the ACC system 20.

According to one embodiment, the location associated with the ACC system 20 is the speedometer 70 and the information 68 includes values on the speedometer 70 including the current speed, speed limits, and set speed entered by the driver. Alternatively, the information 68 includes general information such as "I am working properly, I am trying to reach your set speed".

According to another embodiment, the location associated with the ACC system 20 is a set of controls used to provide input (e.g., set speed) to the ACC system 20 and the information 68 includes directions on how to use the set of controls to operate the ACC system 20.

Referring to FIGS. 38-39, the driver context information application 120 includes computer-readable instructions that, when executed by the processor 100, cause the processor 100 to perform the driver context information method 1000. According to the driver context information method 1000, information 68 is based on a measurement from the sensor 30 that represents a driver's context and the information is presented when the driver gazes for a period of time at a location associated with a vehicle system 20.

The information 68 to be communicated by the computing device 40 may be static (e.g., fixed or predetermined) or may be dynamic (e.g., may change over time). The information 68 may be generated and stored to be accessed by the computing device 40. Alternatively, the computing device 40 may generate the information 68 in real-time or request that the vehicle system 20 generate the information 68 in real-time.

The measurement from the sensor 30 represents the driver's context or is used to identify a context. For example, a context includes the driving experience of a driver (e.g., novice/expert, age), environment 50 outside the vehicle 10 (e.g., weather, road conditions), environment 50 inside the vehicle 10 (e.g., occupancy, temperature), and the status of the vehicle systems 20 (e.g., fuel level). Driver experience can be determined by facial recognition associated with a driver profile that includes an age or experience metric.

At a block 1010, the processor 100 analyzes output data 62, 64, 66 from the sensor 30. At a block 1020, the processor 100 identifies or generates a context 1022 based on the output data 62, 64, 66.

At a block 1030, the processor 100 identifies or generates context information 1032 that is specific to a vehicle system 20 and the context 1022.

Blocks 1040, 1050, 1060 of the driver context information method 1000 are similar to blocks 910, 920, 930 of the vehicle system information method 900 and are described with reference to FIG. 37.

At a block 1040, the processor 100 analyzes gaze location data 942 to monitor a gaze location 94 of a driver. If the gaze location 94 is at the location 902 associated with a vehicle system 20 for a time 944 that is greater than a threshold time 946, at a block 1050, a gaze is registered and, at a block 1060, the processor 100 communicates the context information 1032 associated with the vehicle system 20 (i.e., that which is specific to the vehicle system 20 associated with the location 902). The context information 1032 is communicated visually on the display 60 and/or audibly through the audio system 88 of the vehicle 10.

For example, the processor 100 analyzes output data 62 from the sensor 30 and, based on the output data 62, determines that the driver is a novice 1022. The processor 100 generates or identifies context information 1032 for the vehicle systems 20 based on the driver being a novice 1022.

Using the ACC system 20 as an example of a vehicle system 20, a location 902 associated with the ACC system 20 is the dial 22 for the ACC system 20. When the processor 100 registers a gaze at the dial 22 of the ACC system 20, the processor 100 accesses the context information 1032 for the ACC system 20. For example, the context information 1032 includes directions for operating the ACC system 20 that would be useful to a novice driver. The processor 100 communicates the context information 1032 visually on the display 60 and/or audibly through a speaker system of the vehicle 10.

For example, the processor 100 analyzes an output data 62 from the sensor 30 and, based on the output data 62, determines an occupancy 1022 of the vehicle. The processor 100 generates or identifies context information 1032 for the vehicle systems 20 based on the occupancy 1022 of the vehicle. Context information 1032 includes that which would provide a more comfortable settings to all passengers based on the occupancy 1022.

Using a heating ventilation air conditioning (HVAC) system 20 as an example of a vehicle system 20, a location 902 associated with the HVAC system 20 is the dial 22 for the HVAC system 20. When the processor 100 registers a gaze at the dial 22 of the HVAC system 20, the processor 100 accesses the context information 1032 for the HVAC system 20. For example, the context information 1032 includes directions for operating the back vents of the HVAC system 20 because the occupancy 1022 includes passengers in the back seat of the vehicle 10 (e.g., the car is fully packed). The processor 100 communicates the context information 1032 visually on the display 60 and/or audibly through a speaker system of the vehicle 10.

Various embodiments of the present disclosure are disclosed herein. The disclosed embodiments are merely examples that may be embodied in various and alternative forms, and combinations thereof. As used herein, for example, "exemplary," and similar terms, refer expansively to embodiments that serve as an illustration, specimen, model or pattern.

Variations, modifications, and combinations may be made to the above-described embodiments without departing from the scope of the claims. All such variations, modifications, and combinations are included herein by the scope of this disclosure and the following claims.

The invention claimed is:

1. A system, comprising:
a vehicle navigation system configured to determine a vehicle geographical location;
a gaze detection device configured to determine a gaze location;
an interface;
a processor; and
a memory, comprising:
a set of default geographical location values;
default navigation information associated with the set of default geographical location values;
a set of auxiliary geographical location values; and
auxiliary navigation information associated with the set of auxiliary geographical location values;
a pre-determined interior location in a vehicle that is associated with the vehicle navigation system;
computer-readable instructions that, when executed by the processor, cause the processor to:
compare the gaze location determined by the gaze detection device to the pre-determined interior location in the vehicle;
register a gaze if the gaze location determined by the gaze detection device matches the pre-determined interior location in the vehicle;
if a gaze is not registered, communicate, via the interface, the default navigation information associated with one of the set of default geographical location values where the vehicle geographical location from the vehicle navigation system matches the one of the set of default geographical location values; and
if a gaze is registered, communicate, via the interface:
the default navigation information associated with one of the set of default geographical location values where the vehicle geographical location from the vehicle navigation system matches the one of the set of default geographical location values; and the auxiliary navigation information associated with one of the set of auxiliary geographical location values where the vehicle geographical location from the vehicle navigation system matches the one of the set of auxiliary geographical location values.

2. The system of claim 1, wherein register a gaze if the gaze location determined by the gaze detection device matches the pre-determined interior location in the vehicle for an amount of time that is greater than a threshold time.

3. The system of claim 1, further comprising computer-readable instructions that, when executed by the processor, cause the processor to:

calculate a gaze frequency at the pre-determined interior location in the vehicle that is associated with the vehicle navigation system, wherein the gaze frequency is calculated over a period of time and is based on one of:

a number of times a gaze location moves to the pre-determined interior location in the vehicle that is associated with the vehicle navigation system; and a time a gaze location spends at the pre-determined interior location in the vehicle that is associated with the vehicle navigation system; and wherein the gaze is registered if the gaze frequency is greater than a threshold gaze frequency.

4. The system of claim 1, wherein each of the default navigation information and the auxiliary navigation information includes driving directions.

5. The system of claim 1, wherein the pre-determined interior location in the vehicle associated with the vehicle navigation system is a human machine interface associated with the vehicle navigation system.

6. The system of claim 1, wherein the pre-determined interior location in the vehicle associated with the vehicle navigation system is a display.

* * * * *